Jan. 5, 1943.   H. B. ARMSTRONG   2,307,379
DIMMER FOR FLASH LAMPS
Filed Feb. 20, 1942
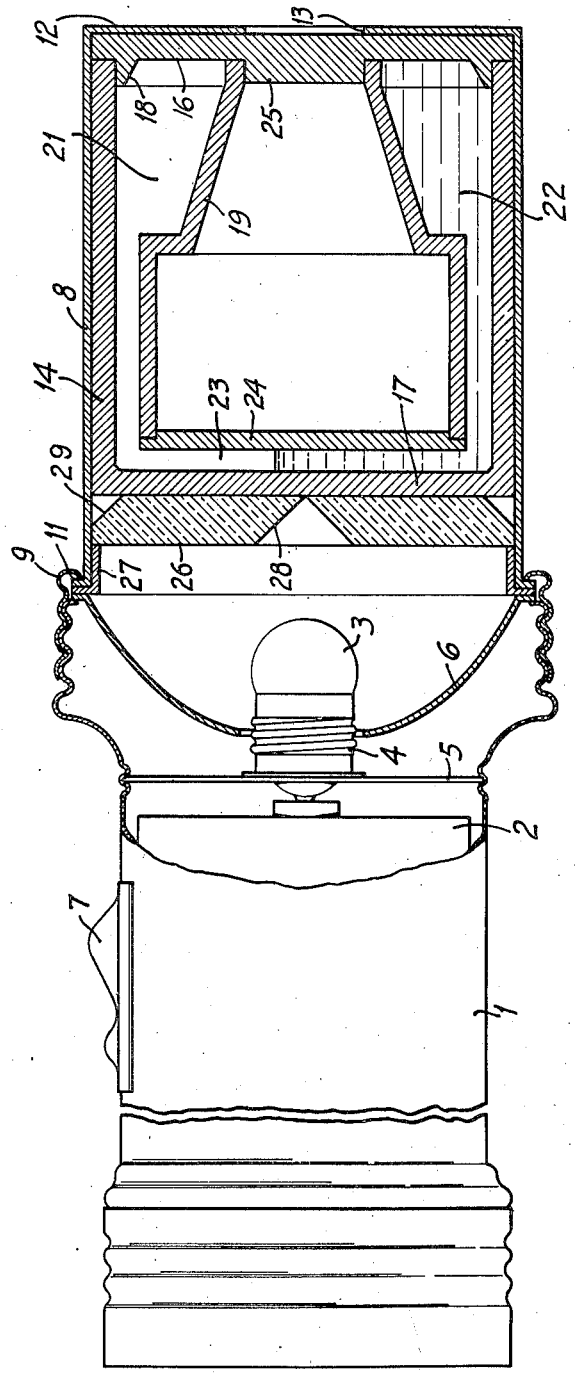
INVENTOR
HENRY B. ARMSTRONG
BY Charles J. Evans
HIS ATTORNEY Patented Jan. 5, 1943

2,307,379

UNITED STATES PATENT OFFICE 2,307,379

DIMMER FOR FLASH LAMPS

Henry B. Armstrong, San Francisco, Calif.

Application February 20, 1942, Serial No. 431,739

13 Claims. (Cl. 240—10.6)

My invention relates to a dimmer for flash lamps particularly adapted for use during blackouts.

The principal object of the invention is to provide a dimmer for flash lamps embodying means for controlling light from the lamp to prevent its beam from being directed upwardly where it might become visible to an aerial observer.

Another object is to provide means for progressively blocking light from the lamp upon movement of the flash lamp casing through a vertical arc; which means operates to completely block the light at a predetermined angular position of the casing.

Still another object is to provide light control means of the character described which is adaptable for mounting as an attachment to an ordinary flash lamp casing.

A further object is to provide a flash lamp which emits a beam of substantially uniform intensity.

The invention possesses other objects and features of advantage, some of which, with the foregoing, will be set forth in the following description of my invention. It is to be understood that I do not limit myself to this disclosure of my invention, as I may adopt variant embodiments thereof within the scope of the claims.

Referring to the drawing:

The figure of the drawing is a side view, partly in section and partly in elevation, showing a dimmer embodying the improvements of my invention as an attachment for a conventional flash lamp; portions of the casing being omitted to shorten the view. The hazards of using ordinary sources of light during blackouts are manifest, and are of two types: first, visibility of source to an aerial observer, and second, visibility of objects illuminated by light from the source. Of the two hazards, that of visibility of source has been declared by the authorities to be many times greater. Consequently, a primary object of my invention is to render the source of light completely invisible to an aerial observer at all times, yet simultaneously to make available all possible light in groundward directions.

In terms of broad inclusion, my invention comprises means responsive to movement of a flash lamp casing for controlling the light from the lamp. The control means preferably includes a light impervious fluid flowable across the path of light from the lamp to progressively block the light upon movement of the casing through a vertical arc, and to completely block the light at a predetermined angular position of the casing. Means are also preferably provided whereby the flash lamp emits a beam of substantially uniform intensity.

In greater detail, and referring to the drawing, the illustrated conventional flash lamp comprises a casing 1 for housing the battery 2, one cell of which is shown. A suitable lamp or globe 3 is disposed ahead of the leading cell and is held in a socket 4 mounted on a cross plate 5 and disposed at the center of a parabolic reflector 6. The circuit to the lamp is closed by a suitable switch 7 on the casing. These parts are commonly found in ordinary flash lamps to which my attachment is applied.

In my improved construction a tubular extension 8, preferably of metal, is arranged coaxially of casing 2 ahead of reflector 6. This extension is conveniently held in place by the usual retaining ring 9 threaded on the end of the casing and engaging an outturned flange 11 on the extension. The forward end of the extension has an end plate 12 provided with a central aperture 13, say about 3/4 inch in diameter, through which the beam of light is emitted.

Within extension 8 is positioned a cylindrical shell 14 having end plates 16 and 17 providing a liquid tight drum. The rear end plate 17 is preferably formed as an integral part of the shell, while the forward plate 16 is made as a separate piece to facilitate assembly. An inwardly extending flange 18 on the forward plate provides a seat for the rim of the shell. A suitable sealing material applied at the joint forms a liquid tight closure. Since light passes through the end plates 16 and 17, the shell is made of a transparent material, preferably a moldable plastic, such as Lucite.

A core 19 is disposed coaxially within shell 14 to form a chamber having an annular reservoir portion 21 for retaining a supply of light impervious fluid 22, and having a diaphragm portion 23 into and out of which the fluid may flow in response to movement of the casing. Diaphragm portion 23 of the chamber lies between the end of the core and end plate 17 of the shell, thus extending across the path of light through the device. When the casing is moved upwardly in a vertical arc the fluid 22 flows into diaphragm portion 23 of the chamber, and the rising dam of fluid progressively blocks the light from lamp 3.

The chamber is shaped and proportioned so that with a measured quantity of fluid the rising dam completely blocks the light when the casing reaches a predetermined angular position, say a few degrees above the horizontal. The parts are also proportioned so that all of the fluid flows out of the diaphragm chamber 23 into the reservoir when the casing is tipped below the horizontal, thus allowing a full beam of light to pass in downwardly extending positions of the casing.

The core shape illustrated is preferred, in which the rear portion is cylindrical and the forward portion is reduced in size and of conical shape. This provides an annular reservoir of increasing capacity toward the forward part of the unit. The advantage of the annular chamber is that the fluid maintains a constant level when the unit is rotated about its own axis. Core 19 lies in the path of light and is therefore of a transparent material. A moldable plastic, such as Lucite, is preferably employed.

The core may be solid, but to conserve material and reduce weight I preferably use a hollow construction with a closure plate 24 at the rear end. This plate has a peripheral groove to receive the end of the core; the joint being sealed with a suitable composition. The other end of the core is fitted over a boss 25 formed on end plate 16 to hold the core in position. This joint is also sealed to prevent fluid from entering the hollow core.

Fluid 22 may be any light impervious liquid which blocks the passage of light either by reflection or absorption. Mercury may be used, or a fluid containing a dye may be employed. A good fluid may be made by dissolving 50 grains of nigrosine dye crystals in a solution comprising 50 ounces of water and 50 ounces of wood alcohol. It is preferable, of course, to avoid using fluids which have a tendency to bubble or foam and to thus preclude unnecessary disturbance of the emitted light rays and to the end that the masking of the light progressively as the lamp is moved through a vertical arc may be in sharp definition.

I also preferably include means in the unit for producing a light beam of substantially uniform intensity. It is well known that the center of a beam from an ordinary flash lamp is less intense than other parts of the beam. This is due to the fact that the parallel rays reflected from a parabolic reflector do not reinforce the direct light at the center of the beam. In my construction a transparent plate 26 of glass or transparent plastic is arranged in the tubular extension, preferably behind the fluid retaining drum. Suitable means, such as a spacer ring 27 having a flange caught by clamping ring 9, is provided for holding plate 26 and the fluid drum within the extension. The rim of plate 26 is beveled and the beveled face is polished to provide an inclined or conical reflecting surface 29 disposed at about 45 degrees to the axis of the unit so that part of the light from reflector 6 is directed radially toward the center of the plate. At the plate center is provided a conical recess having a polished inner face to form a reflecting surface 28, also disposed at about 45 degrees to the axis, so as to direct the radial rays outwardly along the center of the beam. By this arrangement the light intensity may be built up at the beam center so that the final beam is of uniform intensity. This feature is useful in ordinary flash lamps as well as in conjunction with one embodying my other improvements.

In flash lamps adapted for use during blackouts it is desirable to subdue the light so that the intensity does not exceed say one candlepower. Ordinary flash lamps emit a beam that is too intense, so I preferably treat one of the surfaces in the unit, such as the forward surface of plate 26, to diffuse the light. The necessary diffusion can be accomplished by simply roughening the surface. In addition to subduing the light my unit restricts it to a relatively narrow beam, determined largely by the size of forward aperture 13. A beam having a solid angle of less than 45 degrees is preferred.

In describing the structure of my improved unit it has been noted that a full beam will be emitted in downwardly extending positions of the casing, due to the fact that there is no fluid in diaphragm chamber 23 at such times to block the light. It has also been noted that moving the casing upwardly in a vertical arc causes the fluid level to rise in the diaphragm chamber to progressively block the light until a predetermined position is reached where all the light is cut off. During progressive blocking of the light the shape characteristics of the beam are controlled by aperture 13 and the fluid dam in the diaphragm chamber. The direction of light rays, as modified by reflection from surfaces within the unit and by the shadow effects, throws a spot of light on a screen in which substantially no light appears above a limiting plane, which plane is determined by the fluid level in the diaphragm chamber. The size and shape of the reservoir chamber is preferably such that the rate of fluid flow into the diaphragm chamber maintains the limiting plane at substantially a fixed level on a screen when the casing is moved through a vertical arc. This feature of confining light to regions below a limiting plane is important in a flash lamp for use during blackouts because it prevents light rays from being directed upwardly as the casing moves up toward the horizontal and before the light is completely cut off.

I claim:

1. A flash lamp including a casing, a chamber having a diaphragm portion extending across the path of light from the lamp, and a light impervious fluid in the chamber flowable therefrom into the diaphragm portion to intercept light from the projector when the emergent light beam axis is directed skywardly and flowable from said diaphragm portion into said chamber to clear the light path when the emergent light beam axis is directed groundwardly.

2. A flash lamp including a casing, a chamber having an annular reservoir portion disposed about the path of light from the lamp and having a diaphragm portion extending across said path, and a light impervious fluid in the chamber flowable therefrom into the diaphragm portion to intercept light from the projector when the emergent light beam axis is directed skywardly and flowable from said diaphragm portion into said chamber to clear the light path when the emergent light beam axis is directed groundwardly.

3. In combination with a flash lamp having a casing, a shell coaxial with the casing, means for securing the shell to the casing, a light transmitting core disposed in the shell and providing therebetween a chamber having a reservoir portion and a diaphragm portion extending across an end of the core, and a light impervious fluid in the chamber flowable therefrom into the diaphragm portion to intercept light from the projector when the emergent light beam axis is directed skywardly and flowable from said diaphragm portion into said chamber to clear the light path when the emergent light beam axis is directed groundwardly.

4. A dimmer for light projectors comprising a chamber having an annular reservoir portion disposed about the path of light from the projector and having a diaphragm portion extending across said path, and a light impervious fluid in the chamber flowable therefrom into the diaphragm portion to intercept light from the projector when the emergent light beam axis is directed skywardly and flowable from said diaphragm portion into said chamber to clear the light path when the emergent light beam axis is directed groundwardly.

5. A dimmer for light projectors comprising a shell, means for detachably securing the shell to a light projector, a light transmitting core disposed in the shell and providing therebetween a chamber having an annular reservoir portion and a diaphragm portion extending across an end of the core, and a light impervious fluid in the chamber flowable therefrom into the diaphragm portion to intercept light from the projector when the emergent light beam axis is directed skywardly and flowable from said diaphragm portion into said chamber to clear the light path when the emergent light beam axis is directed groundwardly.

6. A dimmer for light projectors comprising a reservoir arranged annularly of the light path and having in communication therewith a diaphragm portion extending across said light path, a light impervious fluid in the reservoir flowable therefrom into the diaphragm portion to intercept light from the projector when the emergent light beam axis is directed skywardly and flowable from said diaphragm portion into said reservoir to clear the light path when the emergent light beam axis is directed groundwardly.

7. A dimmer for light projectors comprising a chamber having a diaphragm portion extending across the path of light from the lamp, and a light impervious fluid in the chamber flowable into said diaphragm portion to intercept light from the projector when the light projector and chamber are tilted to direct the beam skyward and flowable out of said diaphragm portion to clear the light path when the light projector and chamber are tilted to direct the beam groundward.

8. A dimmer for light projectors comprising a chamber having a diaphragm portion extending across the path of light from the lamp, means for connecting the chamber to a light projector, a light impervious fluid in the chamber flowable into said diaphragm portion to intercept light from the projector when the assembled projector and chamber are tilted to direct the light beam skyward and flowable out of said diaphragm portion to clear the light path when the assembly is tilted to direct the light beam groundward.

9. A dimmer for light projectors comprising a chamber having a reservoir portion disposed outside the path of light from the projector and having a diaphragm portion extending across said light path, a light impervious fluid in the reservoir flowable therefrom into the diaphragm portion to intercept light from the projector when the emergent light beam axis is directed skywardly and flowable from the diaphragm portion into the reservoir portion when the emergent light beam axis is directed groundwardly.

10. A dimmer for light projectors comprising a chamber having a reservoir portion disposed outside the path of light from the projector and having a diaphragm portion extending across said light path, a light impervious fluid in the reservoir flowable therefrom into the diaphragm portion to intercept light from the projector when the emergent light beam axis is directed skywardly and flowable from the diaphragm portion into the reservoir portion when the emergent light beam axis is directed groundwardly, the said chamber being circularly symmetrical about the light beam axis to permit rotation of the chamber about the light beam axis without impairment of flow of the light impervious fluid between the reservoir and diaphragm portions in the tilting of the light beam axis.

11. A dimmer for light projectors comprising a chamber having a reservoir portion disposed outside the path of light from the projector and having a diaphragm portion extending across said light path, means for connecting the chamber to a light projector, a light impervious fluid in the reservoir flowable therefrom into the diaphragm portion to intercept light from the projector when the emergent light beam axis is directed skywardly and flowable from the diaphragm portion into the reservoir portion when the emergent light beam axis is directed groundwardly, the said chamber being circularly symmetrical about the light beam axis to permit rotation of the chamber about the light beam axis without impairment of flow of the light impervious fluid between the reservoir and diaphragm portions in the tilting of the light beam axis.

12. A dimmer for light projectors movable through a range of inclinations comprising, a casing, a rear entrance window in the casing, a front exit window in the casing in spaced relation to the entrance window, a sealed fluid chamber within the casing having a diaphragm portion extending across the path of light and a communicating reservoir portion disposed out of the path of light, a light impervious fluid in the chamber flowable into the reservoir portion when the exit window of the dimmer is directed to project the emergent light in groundward directions and flowable into the diaphragm portion when the exit window of the dimmer is directed skyward, the relation between the exit window and the flow of the light impervious fluid into the diaphragm portion being such that all skywardly emitted light above a predetermined observation level is arrested.

13. A dimmer for light projectors movable through a range of inclinations comprising, a casing, means for attaching the casing to a light projector, a rear entrance window in the casing, a front exit window in the casing in spaced relation to the entrance window, a diffuser across the entrance window, a sealed fluid chamber within the casing having a diaphragm portion extending across the path of light and a communicating reservoir portion disposed out of the path of light, a light impervious fluid in the chamber flowable into the reservoir portion when the exit window of the dimmer is directed to project the emergent light in groundward directions and flowable into the diaphragm portion when the exit window of the dimmer is directed skyward, the relation between the exit window and the flow of the light impervious fluid into the diaphragm portion being such that all skywardly emitted light above a predetermined observation level is arrested.

HENRY B. ARMSTRONG.